US012213211B2

(12) United States Patent
Johnson et al.

(10) Patent No.: US 12,213,211 B2
(45) Date of Patent: Jan. 28, 2025

(54) SPLIT INPUT AND OUTPUT (IO) FOR SUBSCRIBER IDENTITY MODULE (SIM) SWAPS

(71) Applicant: AT&T Intellectual Property I, L.P., Atlanta, GA (US)

(72) Inventors: Lars Benjamin Johnson, Brooklyn, NY (US); Wei Wang, Harrison, NJ (US); Rachel Rosencrantz, Seattle, WA (US); Mikhail Istomin, Brooklyn, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 318 days.

(21) Appl. No.: 17/587,592

(22) Filed: Jan. 28, 2022

(65) Prior Publication Data
US 2023/0276222 A1 Aug. 31, 2023

(51) Int. Cl.
| H04W 12/30 | (2021.01) |
| H04L 9/40 | (2022.01) |
| H04W 8/18 | (2009.01) |
| H04W 8/24 | (2009.01) |
| H04W 12/45 | (2021.01) |

(52) U.S. Cl.
CPC ............. *H04W 8/183* (2013.01); *H04W 8/24* (2013.01); *H04W 12/45* (2021.01)

(58) Field of Classification Search
None
See application file for complete search history.

(56) References Cited

U.S. PATENT DOCUMENTS

| 8,707,029 | B2* | 4/2014 | Brand | H04L 9/3263 726/10 |
| 8,862,097 | B2* | 10/2014 | Brand | G06Q 20/42 455/418 |
| 9,787,343 | B2* | 10/2017 | Flores Cuadrado | H04M 15/50 |
| 9,906,954 | B2* | 2/2018 | McClement | H04W 12/06 |
| 10,986,085 | B2* | 4/2021 | Ou | H04L 63/083 |
| 11,017,100 | B2* | 5/2021 | Krishnamoorthy | G06F 21/6218 |
| 11,159,909 | B2* | 10/2021 | Anderson | G01S 19/35 |
| 11,304,056 | B2* | 4/2022 | D. R. | H04L 63/0838 |
| 11,368,849 | B1* | 6/2022 | Reeves | H04W 12/67 |
| 11,445,374 | B2* | 9/2022 | Uy | H04L 63/0853 |
| 11,483,307 | B2* | 10/2022 | Nair | H04L 9/3228 |

(Continued)

*Primary Examiner* — Tuan A Tran
(74) *Attorney, Agent, or Firm* — Guntin & Gust, PLC; Ralph Trementozzi

(57) ABSTRACT

Aspects of the subject disclosure may include, for example, receiving, from a computing device, a user request to perform a subscriber identity module (SIM) swap for a subscriber, wherein the computing device and a user device are accessible to a user, based on the receiving the user request, generating a code for the SIM swap, resulting in a generated code, providing the generated code to the computing device for presentation, obtaining, from the user device, data associated with the user, the user device, or a combination thereof, facilitating user authentication responsive to the obtaining the data, detecting a transmission of a particular code from the user device, resulting in a detected code, and, based on the detecting the transmission and based on the facilitating the user authentication, performing an action relating to the SIM swap. Other embodiments are disclosed.

20 Claims, 9 Drawing Sheets

(56) References Cited

U.S. PATENT DOCUMENTS

| | | | | |
|---|---|---|---|---|
| 11,489,813 B2* | 11/2022 | Kaidi | ................... | H04L 63/1466 |
| 11,533,625 B2* | 12/2022 | Loreskar | ............. | H04L 63/0853 |
| 11,647,017 B2* | 5/2023 | Ou | ...................... | H04L 63/0876 |
| | | | | 726/7 |
| 11,699,155 B2* | 7/2023 | Dutt | ..................... | G06Q 20/322 |
| | | | | 705/325 |
| 11,706,629 B2* | 7/2023 | Reeves | ................. | H04W 12/67 |
| | | | | 726/26 |
| 11,811,777 B2* | 11/2023 | Guan | ..................... | H04L 63/102 |
| 11,838,757 B2* | 12/2023 | McClement | .......... | H04W 12/06 |
| 11,861,582 B2* | 1/2024 | Nagaraja | ............. | H04W 12/121 |
| 11,974,129 B2* | 4/2024 | Schumacher | ......... | H04W 12/72 |
| 11,985,507 B2* | 5/2024 | Reeves | ................. | H04W 12/72 |
| 2023/0048931 A1 | 2/2023 | Istomin et al. | | |

* cited by examiner

SPLIT INPUT AND OUTPUT (IO) FOR SUBSCRIBER IDENTITY MODULE (SIM) SWAPS

FIELD OF THE DISCLOSURE

The subject disclosure relates to split input and output (IO) implementations for subscriber identity module (SIM) swaps.

BACKGROUND

Mobile device subscribers often lose their devices, whether it be due to negligence or theft. When this occurs, the subscriber would generally visit one of their network provider's store locations, or contact the network provider over the phone, to report the issue. An agent of the network provider would then perform a SIM swap procedure where the subscriber's mobile telephone number/subscription is transferred to (or becomes associated with) a different mobile device.

BRIEF DESCRIPTION OF THE DRAWINGS

Reference will now be made to the accompanying drawings, which are not necessarily drawn to scale, and wherein.

DETAILED DESCRIPTION

Figure 1:
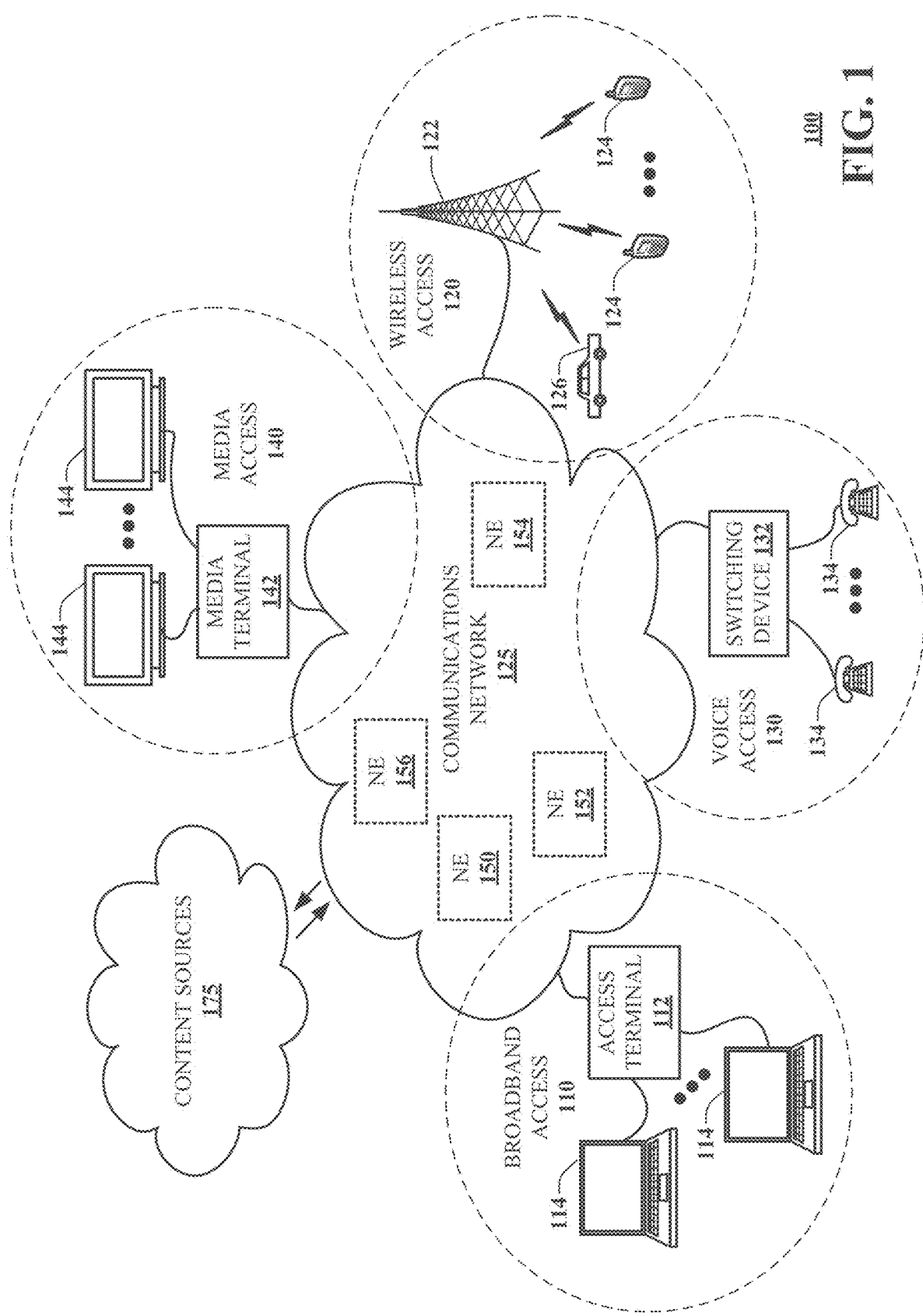
FIG. 1 is a block diagram illustrating an exemplary, non-limiting embodiment of a communications network in accordance with various aspects described herein.

In recent years, the amount of fraud associated with mobile devices has risen dramatically, which has been a challenging problem particularly for mobile network operators or providers. To address illegitimate SIM swaps in particular, network providers have taken various steps to detect and/or block such swaps. In some instances, an issue may be identified after an affected subscriber complains about service issues/interruptions (such as, e.g., not receiving phone calls or messages or not being able to use their data plan) or complains about stolen assets, such as lost crypto wallets/cryptocurrencies, which can negatively impact the network provider's perceived image and reliability and lead to poor customer experience. In any case, it will be advantageous to provide improved system(s) for preventing/combatting illegitimate SIM swaps.

The subject disclosure describes, among other things, illustrative embodiments of a split input and output (IO) system that is capable of effecting out-of-band authentication to minimize or eliminate SIM swap fraud. In exemplary embodiments, the split IO system includes a backend system that is configured to create (or provide for) two or more separate portions of inputs and outputs and/or two or more separate communication channels, such that there is a "split" in communications with, and functions of, a trusted device and an untrusted device in the context of a SIM swap. In various embodiments, for example, a personal mobile/user device of an agent of the network provider (e.g., a store employee or data center customer representative) may be treated as a trusted device, and may be communicatively coupled to the backend system over one communication channel (e.g., a mobile network, such as a 5G network or the like) and associated with certain SIM swap-related inputs/outputs. Continuing the example, a computing device at the network provider's store location, or customer service data center, may be treated as an untrusted device, and may be communicatively coupled to the backend system over a different communication channel (e.g., another type of network, such as a wired network) and associated with a different set of SIM swap-related inputs/outputs. In one or more embodiments, subscriber data may reside in one or more of the network provider's various system(s), and may be accessible/viewable (e.g., only) by certain computers, such as the abovementioned computing device, where changes to the subscriber data, such as in connection with a SIM swap procedure, may be provided/inputted (e.g., only) by way of these computers, and outputs relating to the swaps may be provided (e.g., only) to these computers. In certain embodiments, permission for performing/authorizing SIM swaps is "split" to personal devices, such as the abovementioned personal/mobile user device, where users requesting such swaps from the computers are (e.g., required) to authenticate themselves and/or confirm the swaps using their personal devices, as described herein.

Providing (e.g., on demand) out-of-band authentication for SIM swap procedures, as described herein, adds minimal to no strain to legitimate transfers (such as for a new customer switching from a different network provider or for SIM card replacements due to failures), and yet hinders hackers from effecting illegitimate swaps using malware and command-and-control servers. This offers enhanced SIM swap protection for mobile network operators and subscribers alike. Although hackers will undoubtedly continue to evolve their methods, dividing aspects of a SIM swap transaction between two separate devices and two separate communication channels/networks substantially complicates their efforts, since it would be more difficult to manage two attack surfaces. Further, even in a case where a rogue employee assists a hacker in a fraudulent SIM swap, association of the transaction and the employee based on the out-of-band authentication, as described herein, can discourage such assistance at the outset, or at least enable the network operator to identify the culprit and take steps to prevent it from reoccurring.

In exemplary embodiments, the split IO system may leverage an authentication system that provides mobile identity and authentication services, such as mobile/user identity verification via network operator authentication of subscriber accounts or subscriber identity modules (SIMs). In one or more embodiments, the authentication system may employ multi-factor authentication, and may include one or more (e.g., network) carrier- or provider-based authentication systems, instances of an authentication app individually installed on mobile devices of various users, and an authentication management system that interacts with the authentication app(s) and the provider-based authentication system(s) to facilitate mobile/user identity verification(s). Leveraging such an authentication system as part of the out-of-band authentication solution described herein can further ensure the integrity of user authentications.

One or more aspects of the subject disclosure include a device, comprising a processing system including a processor, and a memory that stores executable instructions that, when executed by the processing system, facilitate performance of operations. The operations can include receiving, from a computing device, a user request to perform a subscriber identity module (SIM) swap for a subscriber, wherein the computing device and a user device are accessible to a user. Further, the operations can include, based on the receiving the user request, generating a code for the SIM swap, resulting in a generated code. Further, the operations can include providing the generated code to the computing device for presentation. Further, the operations can include obtaining, from the user device, data associated with the user, the user device, or a combination thereof. Further, the operations can include facilitating user authentication responsive to the obtaining the data. Further, the operations can include detecting a transmission of a particular code from the user device, resulting in a detected code. Further, the operations can include, based on the detecting the transmission and based on the facilitating the user authentication, performing an action relating to the SIM swap.

One or more aspects of the subject disclosure include a non-transitory machine-readable medium, comprising executable instructions that, when executed by a processing system of a computing device including a processor, facilitate performance of operations. The operations can include receiving a user request to perform a subscriber identity module (SIM) swap for a subscriber, wherein the computing device and a user device are accessible to a user. Further, the operations can include, based on the receiving the user request, transmitting data regarding the SIM swap to a backend system over a first communication channel or network. Further, the operations can include, responsive to the transmitting, obtaining a code for the SIM swap from the backend system over the first communication channel or network. Further, the operations can include causing the code to be presented responsive to the obtaining the code, wherein a presentation of the code enables the user to utilize the code in a submission from the user device to the backend system over a second communication channel or network, and wherein utilization of the code in the submission, and successful authentication of the user by the backend system via user data or device data provided by the user device, permits the backend system to effect the SIM swap.

One or more aspects of the subject disclosure include a method. The method can comprise causing, by a processing system of a user device including a processor, a first prompt to be presented for user input of access credentials. Further, the method can include, based on receiving the user input, transmitting, by the processing system and to a backend system over a first communication channel or network, data relating to the user input. Further, the method can include, responsive to the transmitting, obtaining, by the processing system and from the backend system over the first communication channel or network, a notification of successful user authentication. Further, the method can include, based on the obtaining the notification, presenting, by the processing system, a second prompt for user entry of a code associated with a SIM swap request, wherein the code is provided by the backend system to a computing device over a second communication channel or network, and wherein the computing device is physically accessible to a user of the user device. Further, the method can include, responsive to the presenting, receiving, by the processing system, the user entry of the code, resulting in a received code. Further, the method can include transmitting, by the processing system, the received code to the backend system over the first communication channel or network, wherein the transmitting the received code causes the backend system to effect a SIM swap operation for the SIM swap request.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, out-of-band authentication(s) to minimize or eliminate SIM swap fraud. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
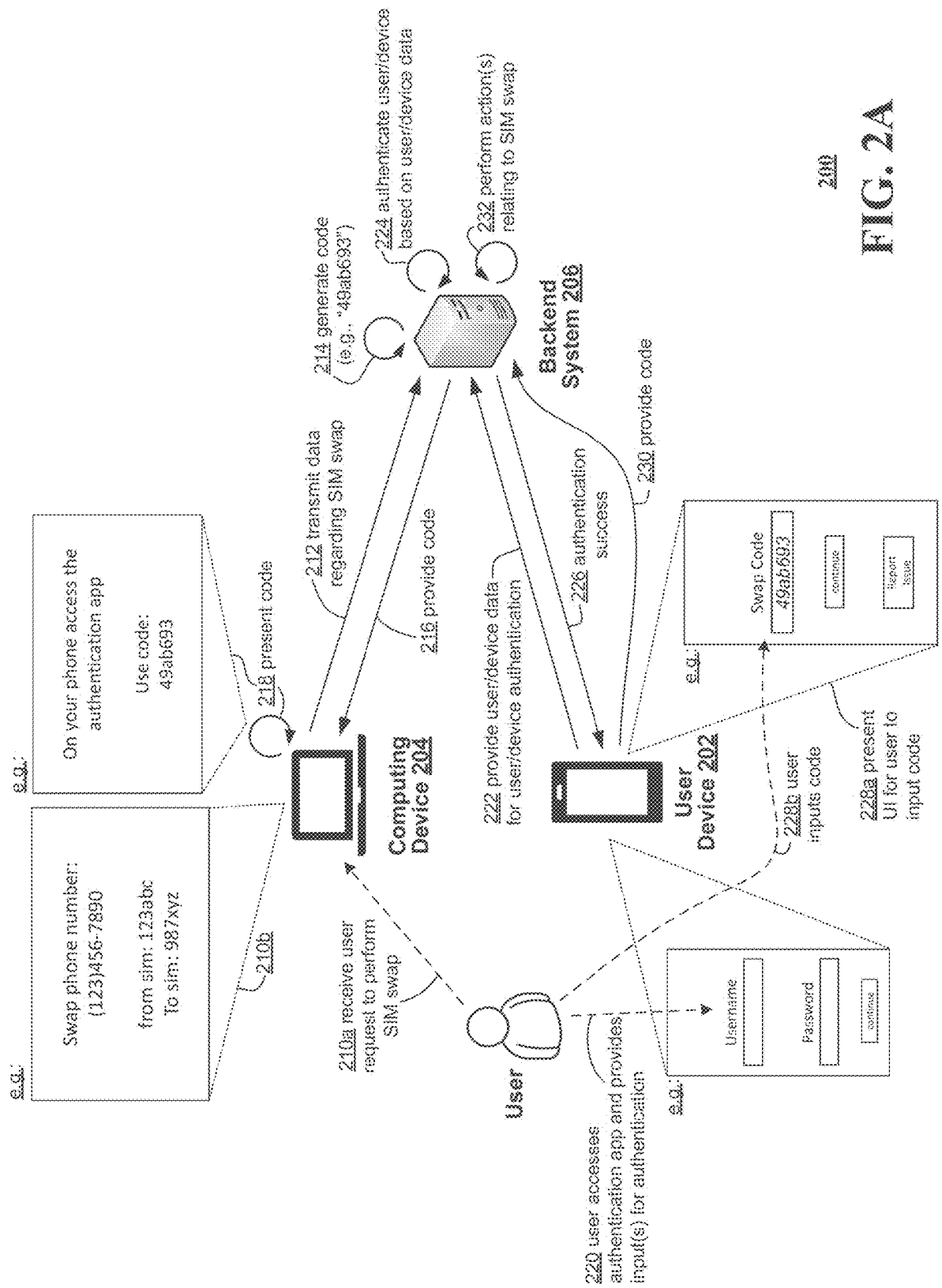
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of a split IO system 200 functioning within, or operatively overlaid upon, the communications network 100 of FIG. 1 in accordance with various aspects described herein. In exemplary embodiments, the split IO system 200 may be capable of effecting out-of-band authentication to minimize or eliminate SIM swap fraud.

As shown in FIG. 2A, the split IO system 200 may include a user device 202, a computing device 204, and a backend system 206. Each of the user device 202 and the computing device 204 can include a communication device, such as a mobile phone (e.g., a smart phone, a radiotelephone, etc.), a wearable communication device (e.g., a smart wristwatch, a pair of smart eyeglasses, media-related gear (e.g., augmented reality (AR), virtual reality (VR), or mixed reality (MR) glasses and/or headset/headphones), etc.), a similar type of device, or a combination of some or all of these devices.

As depicted in FIG. 2A, a user may have access to both the user device 202 and the computing device 204. In exemplary embodiments, the user may be an agent (e.g., an employee, such as a customer service representative) of a network provider. In one or more embodiments, the user device 202 may be a personal mobile/user device of the user, and the computing device 204 may be associated with the network operator and may be located at a physical brick-and-mortar store location, or a customer service data center, affiliated with the network provider.

The backend system 206 can include one or more devices (e.g., server device(s) or the like) configured to provide one or more functions or capabilities, such as, among other things, receiving SIM swap request(s) from computing device(s) (e.g., the computing device 204); based on the request(s), facilitating authentication of user(s) via user device(s) (e.g., the user device 202); and providing overall management of SIM swap processing based on successful authentication of the user(s).

In various embodiments, the computing device 204 may be configured to provide a user interface (UI) for receiving SIM swap requests, and may be capable of accessing (e.g., at or via the backend system 206) subscriber data associated with subscribers of mobile network subscriptions/plans offered by the network provider. Subscriber data can include, for example, a subscriber's personal information (e.g., name, address, phone number, etc.) and/or subscription/device information (e.g., data regarding the subscriber's mobile plan; data regarding the subscriber's historical usage of the mobile plan; one or more SIMs associated with the subscriber, the subscriber's mobile device, or other device(s) associated with the user; etc.).

In one or more embodiments, the user device 202 may be configured to facilitate verification of user identity, such as in connection with a SIM swap request, as described herein. User verification may be performed in any suitable manner, such as based on input of a username/password combination, input of a personal identification number (PIN), user biometric data, and/or the like.

Although not shown, in various embodiments, the split IO system 200 may include, or may be communicatively coupled to, an authentication system that provides authentication-related functionalities implemented in one or more server devices for facilitating mobile/user identity verification. For instance, such an authentication system may include an authentication management server and a provider-based authentication server. The authentication management server and the provider-based authentication server may be configured to communicate with one another as well as with respective authentication apps executing on user devices, such as the user device 202. In one or more embodiments, each of the authentication apps may function as a device-side client of the overall authentication system. In certain embodiments, the provider-based authentication server may correspond to (e.g., may be operated or provided by) the network provider. In exemplary embodiments, the authentication management server may coordinate with the provider-based authentication server to facilitate verification of a user or user device based on subscriber/device/account information.

In various embodiments, a user of a user device (e.g., the user of user device 202) may (e.g., initially) register with the authentication management server and/or the provider-based authentication server, which may enable an authentication app on the user device to facilitate verification of the user device or the user when needed, such as when a SIM swap is to be performed. Registration may, for example, involve the provider-based authentication server (or a related system) enabling a setting in the user's subscriber account to permit utilization of the identity verification feature of the authentication system for the user and/or the user device. When registered, the authentication app on the user device may—e.g., in relation to a SIM swap request—obtain information regarding the user and/or the user device (e.g., the user's name, SIM data stored in the user device, a device serial number (e.g., an International Mobile Equipment Identity (IMEI) number or the like), location data associated with the user device, data regarding a network access point to which the user device is communicatively coupled, biometric information associated with the user, and/or the like), and provide the information to the authentication management server and/or the provider-based authentication server for identity verification. Obtaining information regarding the user device and the user can provide for multi-factor authentication (i.e., 2 or more layers of protection) since, in such a case, both a user's data (e.g., login password, fingerprint, etc.) and device data (e.g., SIM data, IMEI number, etc.) could be used for authentication, which obviates device cloning issues. In this way, for example, a network provider can validate that a certain user device is indeed the user device (and not another user device) and/or that a user is indeed the user (and not another individual).

Although also not shown, in one or more embodiments, each of the user device 202 and the computing device 204 may be communicatively coupled to the backend system 206 over one or more networks. Such network(s) may include one or more wired and/or wireless networks. For example, the network(s) may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

In exemplary embodiments, the user device 202 and the computing device 204 may be communicatively coupled to the backend system 206 over different networks or communication channels. For example, the user device 202 may be communicatively coupled to the backend system 206 over one network (e.g., a mobile network, such as a 5G network or the like), and the computing device 204 may be communicatively coupled to the backend system 206 over a different network (e.g., a wired network). Separating the communication channels in this manner enables out-of-band authentication, which can ensure the integrity and validity of SIM swap transactions, as described herein.

It is to be appreciated and understood that the quantities of the various devices/systems shown in FIG. 2A are merely exemplary. That is, the split IO system 200 may include any number of (e.g., more or fewer) user devices 202, computing devices 204, and backend systems 206. For instance, the split IO system 200 may include multiple user devices 202, multiple computing devices 204, multiple backend systems 206, and so on.

As described in more detail below, the split IO system 200 can be used to provide for out-of-band authentication to mitigate or eliminate SIM swap fraud.

As shown by reference numbers 210a and 210b of FIG. 2A, the computing device 204 may receive a user request to perform one or more SIM swaps. In one or more embodiments, the computing device 204 may be equipped with a split IO application that presents a UI for user input of data relating to SIM swaps. A SIM swap request may include data such as a phone number at issue, information regarding a current SIM associated with the phone number, information regarding a target SIM to be associated with the phone number, and/or the like.

In exemplary embodiments, the UI may enable a user to input data relating to a single SIM swap, and the request may include data for just that single SIM swap. In some embodiments, the UI may enable a user to input data relating to multiple SIM swaps (e.g., for one or more subscribers), and the request may include data for each of those SIM swaps.

As shown by reference number 212, the computing device 204 may transmit, to the backend system 206, data relating to the requested SIM swap(s). As shown by reference numbers 214 and 216, the backend system 206 may generate a (e.g., unique, one-time use) code based on the SIM swap data, and cause the generated code to be provided to the computing device 204. In exemplary embodiments, the backend system 206 may be equipped with split IO functionality that is configured to generate one or more codes and associate the code(s) with the requested SIM swap(s). In a case where the request includes data for a single SIM swap, the backend system 206 may associate the code with (e.g., only) that SIM swap. In a different case where the request includes data for multiple SIM swaps, the backend system 206 may generate a single code and associate that code with each/all of the swaps or, alternatively, generate multiple codes and associate each of the codes with a respective one of the swaps. In various embodiments, the backend system 206 may define a validity period (e.g., 60 seconds, 5 minutes, etc.) for a (e.g., each) code, and may utilize the timer for future code tracking and/or later determination(s) of code validity.

As shown by reference number 216, the backend system 206 may cause the generated code(s) to be provided to the computing device 204. As shown by reference number 218, the computing device 204 may present the received code(s). In various embodiments, the split IO application of computing device 204 may, based upon receiving the code(s), present a UI that includes (e.g., displays or outputs) the code(s). In one or more embodiments, the computing device 204 may present one or more user instructions regarding use of the code(s). For instance, as shown by reference number 218, the UI may include a user instruction (e.g., whether provided by the backend system 206 or generated/obtained based upon receipt of the code from the backend system 206) to access an authentication app on the user's user device (e.g., the user device 202) to utilize the code.

It is to be appreciated and understood that other implementations of the code(s) (and/or mechanisms for a user to utilize the code(s)) may be provided. For example, rather than instructing the user to access an authentication app on the user's user device to utilize the code(s), the computing device 204 may instruct the user to use the user device to access an authentication web site (e.g., via a uniform resource locator (URL) or the like) that is configured to enable usage of the code(s). As another example, although FIG. 2A shows a code as being in alphanumeric form, in some embodiments, a code may be in another format, such as a Quick Response (QR) code format. In the case of a code being a QR code, the computing device 204 may instruct the user to scan the QR code using the user's user device (e.g., user device 202) such that, upon scanning, the user device executes the authentication app, accesses and presents the authentication web site, or the like.

As shown by reference number 220, the user device 202 may prompt (e.g., via an authentication app interface, a browser upon accessing an authentication web site, or the like) the user for identity verification information, and may receive one or more inputs from the user. In certain embodiments, the user may provide access credentials (e.g., a username/password combination, a PIN, biometric information) to the user device 202. In some embodiments, the user device 202 may additionally, or alternatively, obtain (e.g., using the authentication app) other data relating to the user and/or the user device 202, such as the user A's name, SIM data stored in the user device 202, a serial number (e.g., an IMEI number or the like) associated with the user device 202, current and/or historical location data associated with the user device 202, data regarding a network access point to which the user device 202 is currently and/or historically communicatively coupled, and/or the like. In any case, the user device 202 may obtain user/device data (whether in the form of user inputs or other collected data), and, as shown by reference number 222, may transmit the user/device data to the backend system 206 for user/device authentication.

As shown by reference number 224, the backend system 206 may facilitate authentication of the user and/or the user device 202 based on the received user/device data. In various embodiments, in a case where user/device data includes user-inputted access credentials, the backend system 206 may perform verification of the credentials. In one or more embodiments, and in a case where the user/device data additionally, or alternatively, includes other data collected by the authentication app of the user device 202, the backend system 206 may perform analyses and/or verification of that other data. For instance, in these embodiments, the backend system 206 may leverage the above-described authentication system and facilitate provider-based authentication of the user and/or the user device 202 based on that other data. This can provide enhanced authentication of the user and/or the user device 202, since data regarding the current and/or historical location of the user device 202, SIM data associated with the user device 202, the IMEI number of the user device 202, the access point(s) to which the user device 202 is currently and/or historically communicatively coupled, and/or the like can enable a more reliable determination of whether the user device is indeed the user device (and not another user device) and/or whether the user is indeed the user (and not another individual). In any case, where authentication of the user and/or the user device 202 is unsuccessful, the backend system 206 may refrain from processing the SIM swap request.

As shown by reference number 226, the backend system 206 may (e.g., based upon successful verification of the user's identity in accordance with the user/device data) provide a notification of successful authentication to the user device 202. As shown by reference numbers 228a and 228b, the user device 202 may, based on the notification, prompt the user to input the code(s) presented (e.g., at step 218) by the computing device 204, and may receive input(s) of the code(s) from the user. In various embodiments, the user device 202 may (e.g., via the authentication app or web site) present a UI for receiving the input(s) from the user.

As shown by reference number 230, the user device 202 may transmit the inputted code(s) to the backend system 206. As shown by reference number 232, the backend system 206 may, based upon receiving the inputted code(s), perform one or more actions relating to the requested SIM swap(s). In exemplary embodiments, the action(s) may include, for example, assessing whether a code is (e.g., still) valid (e.g., in accordance with a remaining time associated with the above-described timer), updating data store(s) to effect the SIM swap(s) in the network provider's system(s), logging data regarding the SIM swap(s) (e.g., information regarding successful authentication of the user, date/time/ location associated with the SIM swap(s) or receipt of the SIM swap request, and/or the like), causing the user device 202 and/or the computing device 204 to present information regarding success/failure of the SIM swap(s), and/or the like.

In some embodiments, the backend system 206 may be configured to track, for each user (e.g., each agent of the network provider), the number of SIM swaps performed by the user, the timing between consecutive SIM swaps performed by the user, and/or the like, and utilize information from this tracking to determine whether to permit a present SIM swap request submitted by that user. In these embodiments, one or more thresholds (associated with the number of prior-performed SIM swaps, timing between prior SIM swaps, etc.) may be used as part of determining whether to permit a present SIM swap. For instance, a user may (e.g., only) be permitted to perform a limited number of SIM swaps (e.g., five, ten, etc.) per hour, per day, per week, and so on and/or may be permitted to perform no more than a certain number of SIM swaps (e.g., three, six, etc.) every half an hour, every two hours, and so on.

In some implementations of the split IO system 200, only a single SIM swap may be requested for and processed (including user authentication processing and code submission and validation) at a time. In these implementations, each additional SIM swap request may involve repetition of some or all of the steps of FIG. 2A. In alternate implementations of the split IO system 200, multiple SIM swaps may be submitted in a single request. A need to perform multiple SIM swaps may arise in a case where two or more mobile devices associated with the same subscriber (e.g., a mobile device of the subscriber and another mobile device of a family member of the subscriber, all under a common mobile subscription plan) are lost or stolen. In various of these embodiments, the backend system 206 may restrict correlating of a single code with multiple SIM swaps to only those SIM swaps that are associated with the same subscriber.

In various embodiments, whether a request identifies a single SIM swap or multiple SIM swaps, the split IO system 200 may be implemented such that only a single code is generated and associated with the SIM swap(s). Where a request identifies multiple SIM swaps, and a single code is associated with all of the swaps, different manners of implementing user authentication and code submission (e.g., steps 220, 222, 224, 226, 228a, 228b, and/or 230) are possible. As an example, only a single instance of each of steps 220, 222, 224, 226, 228a, 228b, and 230 may be needed, such that the user inputs the code only once and is authenticated only once. As another example, separate authentications may be required for each SIM swap, such that, while the user might input the code only once, certain authentication-related steps (e.g., steps 220, 222, 224, and/or 226) may be repeated in order for each SIM swap to be effected. Continuing this example, after a first one of the SIM swaps is effected, one or more of steps 220, 222, 224, and 226 may be repeated prior to effecting a second one of the SIM swaps, and so on. In this example, one or more additional steps may be employed, such as the backend system 206 instructing the user and/or the user device 202 to re-submit user/device data for each subsequent swap.

In other embodiments, where a request identifies multiple SIM swaps, the split IO system 200 may be implemented such that a different code is generated for each of the SIM swaps. Here, the codes may be identified (e.g., in step 218 of FIG. 2A) as being individually associated with a respective swap—e.g., code "123456" for phone number X, code "555666" for phone number Y, and so on. Further, different manners of implementing user authentication and code submission (e.g., steps 220, 222, 224, 226, 228a. 228b, and/or 230) are also possible. As an example, the user may be authenticated only once, and codes for multiple swaps may be inputted by the user and (e.g., simultaneously) submitted to the backend system 206 for processing. As another example, separate authentications may be required for each SIM swap, such that certain authentication-related steps and/or code submission steps (e.g., steps 220, 222, 224, 226, 228a. 228b, and/or 230) may be repeated in order for each SIM swap to be effected. Continuing this example, after a first one of the SIM swaps is effected, one or more of steps 220, 222, 224, 226, 228*a*, 228*b*, and 230 may be repeated prior to effecting a second one of the SIM swaps, and so on. In this example, one or more additional steps may be employed, such as the backend system 206 instructing the user and/or the user device 202 to enter the next code and/or re-submit user/device data for each subsequent swap to be processed.

In some embodiments, in a case where the code is a QR code (and where, for example, a single SIM swap is being requested), scanning of the QR code (e.g., as described above with respect to step 218) and accessing of the authentication app (or web site) on the user's user device may result in the user device providing an identification of the requested SIM swap to the backend system 206, which can inform the backend system 206 that the SIM swap transaction is to be associated with that user. In such a case, steps 228*a*, 228*b*, and/or 230 may or may not be needed or performed.

Further, although various user inputs and/or outputs have been described above with respect to FIG. 2A as being text-based and/or visual-based, it is to be appreciated and understood that any of the inputs and/or outputs described herein can alternatively be voice-based, audio-based, haptic-based, and/or the like.

Furthermore, although the code(s) have been described as being generated by the backend system 206, in certain alternate embodiments, another device, such as the computing device 204 may generate the code(s). In these embodiments, the computing device 204, for instance, can provide the code(s) to the backend system 206 to facilitate the association of SIM swaps with corresponding authenticated users.

Moreover, other implementations, involving generation, transmission, and usage of a code, are possible. For example, in an alternate configuration, rather than the computing device 204 receiving the code(s) from the backend system 206 and presenting the code(s) (i.e., steps 216 and 218 of FIG. 2A) and rather than the user device 202 obtaining the code(s) therefrom and providing the obtained code(s) to the backend system 206 (i.e., steps 228*a*, 228*b*, and 230 of FIG. 2A), the backend system 206 can instead provide code(s) to the user device 202, the user device 202 may present the code(s), and the computing device 204 may obtain the code(s) therefrom and provide the obtained code(s) to the backend system 206. In this alternate configuration, steps relating to user authentication (i.e., as facilitated via the user device 202 and the backend system 206) and other actions relating to effecting SIM swap(s), storing data relating to swap(s), etc. (i.e., as performed by the backend system 206) described above with respect to FIG. 2A may remain unchanged.

Regardless of the configuration (or set of steps) performed by the various components of the split IO system 200, in one or more embodiments, the backend system 206 may additionally be configured to maintain (or otherwise "keep open") each of the communication channels/sessions with the user device 202 and the computing device 204. Keeping the communication channels/sessions ongoing or alive enables SIM swap processing to be performed in stages, thereby providing additional security to the transactions. For instance, in various embodiments, generation of a code and/or authentication of a user may be performed during one stage of a SIM swap process, and user confirmation (or approval) of the SIM swap (e.g., after the user has been authenticated and the backend system 206 is ready to effect the SIM swap) may be performed during a subsequent stage of the process. Here, this subsequent stage may be considered a "second split" in which the user verifies, using the trusted user device 202, the specific SIM swap operation that the backend system 206 indicates (to the user device 202) that it intends to effect. Presenting details of the ultimate SIM swap operation to be performed, and requesting user confirmation thereof, provides an extra layer of security in the process, since it can address the undesired scenario where a hacker conducts a man-in-the-middle attack and manipulates the SIM swap data that is sent (e.g., step 212 of FIG. 2A) from the computing device 204 to the backend system 206. In a case where what the user inputted into the computing device 204 for the SIM swap does not match what the backend system 206 identifies as the SIM swap to be effected (i.e., due to the hacker's manipulation), the user can easily determine that the system/channel has likely been compromised, and thereby abort the transaction. Embodiments of the split IO system therefore permit even an untrusted computing device (such as computing device 204) to nevertheless be used to submit SIM swap requests, as any compromise of such an untrusted device (or a communication between that untrusted device and the backend system 206) can easily be identified and addressed by the network provider and/or its agents.

In certain alternate embodiments, the backend system 206 (and/or another system associated with the network provider) may, based upon the user being authenticated at (e.g., logged into) the computing device 204 and based upon receiving data from the computing device 204 regarding an identity of the user, perform a lookup operation for the user, identify the user's associated user device 202 from the lookup operation, and automatically transmit an instruction to the user device 202 to perform one or more actions, such as presenting the authentication UI (e.g., reference number 220), providing user/device data for user/device authentication to the backend system 206 (e.g., reference number 222), executing a camera application for code scanning, presenting the code submission UI (e.g., reference number 228*a*), and/or the like. Automatic triggering in this manner can further facilitate the SIM swap process.

It is to be understood and appreciated that the quantity and arrangement of systems and devices shown in FIG. 2A are provided as an example. In practice, there may be additional systems and/or devices, or differently arranged systems and/or devices than those shown in FIG. 2A. For example, the split IO system 200 can include more or fewer systems and/or devices, etc. In practice, therefore, there can be hundreds, thousands, millions, billions, etc. of such systems and/or devices. In this way, example system 200 can coordinate, or operate in conjunction with, a set of systems and/or devices and/or operate on data sets that cannot be managed manually or objectively by a human actor. Furthermore, two or more systems or devices shown in FIG. 2A may be implemented within a single system or device, or a single system or device shown in FIG. 2A may be implemented as multiple systems or devices. Additionally, or alternatively, a set of systems or devices of the system 200 may perform one or more functions described as being performed by another set of systems or devices of the system 200.

While for purposes of simplicity of explanation, the respective processes are shown and described as various steps in FIG. 2A, it is to be understood and appreciated that the claimed subject matter is not limited by the order of the steps, as some steps may occur in different orders and/or concurrently with other steps from what is depicted and described herein. Moreover, not all illustrated steps may be required to implement the methods described herein.

Figure 2B:
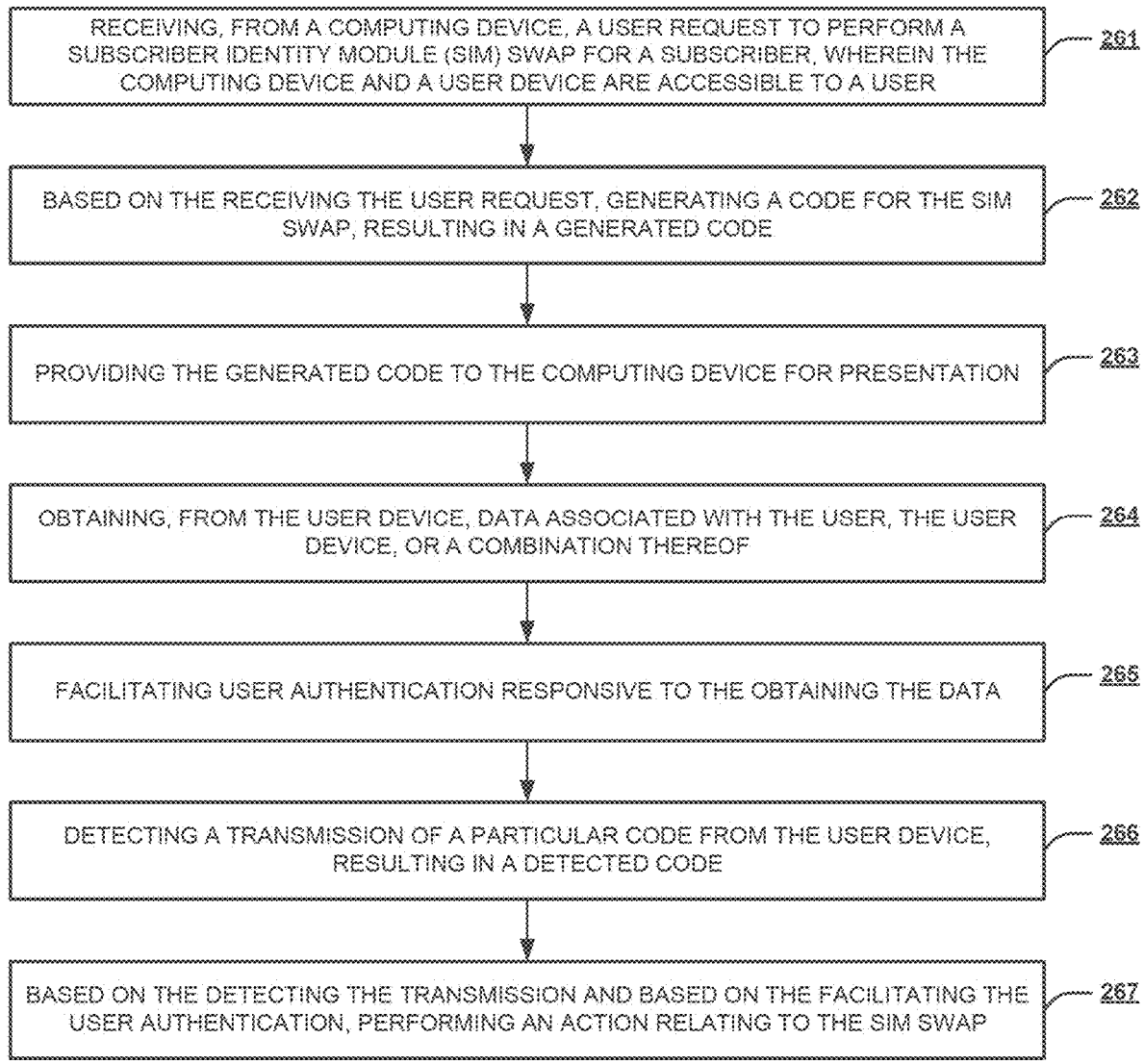
FIG. 2B depicts an illustrative embodiment of a method in accordance with various aspects described herein.

FIG. 2B depicts an illustrative embodiment of a method 260 in accordance with various aspects described herein. In some embodiments, one or more process blocks of FIG. 2B can be performed by a backend system, such as the backend system 206. In some embodiments, one or more process blocks of FIG. 2B may be performed by another device or a group of devices separate from or including the backend system 206, such as the user device 202 and/or the computing device 204.

At 261, the method can include receiving, from a computing device, a user request to perform a subscriber identity module (SIM) swap for a subscriber, wherein the computing device and a user device are accessible to a user. For example, the backend system 206 can, similar to that described elsewhere herein, perform one or more operations that include receiving, from a computing device, a user request to perform a subscriber identity module (SIM) swap for a subscriber. Here, the computing device and a user device may be accessible to a user.

At 262, the method can include, based on the receiving the user request, generating a code for the SIM swap, resulting in a generated code. For example, the backend system 206 can, similar to that described elsewhere herein, perform one or more operations that include, based on the receiving the user request, generating a code for the SIM swap, resulting in a generated code.

At 263, the method can include providing the generated code to the computing device for presentation. For example, the backend system 206 can, similar to that described elsewhere herein, perform one or more operations that include providing the generated code to the computing device for presentation.

At 264, the method can include obtaining, from the user device, data associated with the user, the user device, or a combination thereof. For example, the backend system 206 can, similar to that described elsewhere herein, perform one or more operations that include obtaining, from the user device, data associated with the user, the user device, or a combination thereof.

At 265, the method can include facilitating user authentication responsive to the obtaining the data. For example, the backend system 206 can, similar to that described elsewhere herein, perform one or more operations that include facilitating user authentication responsive to the obtaining the data.

At 266, the method can include detecting a transmission of a particular code from the user device, resulting in a detected code. For example, the backend system 206 can, similar to that described elsewhere herein, perform one or more operations that include detecting a transmission of a particular code from the user device, resulting in a detected code.

At 267, the method can include, based on the detecting the transmission and based on the facilitating the user authentication, performing an action relating to the SIM swap. For example, the backend system 206 can, similar to that described elsewhere herein, perform one or more operations that include, based on the detecting the transmission and based on the facilitating the user authentication, performing an action relating to the SIM swap.

In some implementations of these embodiments, the computing device is a determined untrusted device and is communicatively coupled with the device over a first communication channel or network, and the user device is a determined trusted device and is communicatively coupled with the device over a second communication channel or network different from the first communication channel or network.

In some implementations of these embodiments, the user request includes information identifying a phone number associated with the subscriber, information identifying a source SIM, and information identifying a target SIM.

In some implementations of these embodiments, the data associated with the user, the user device, or the combination thereof comprises SIM data stored in the user device, a serial number of the user device, location data associated with the user device, information regarding a network access point to which the user device is communicatively coupled, biometric information associated with the user, access credentials inputted by the user, or a combination thereof.

In some implementations of these embodiments, the facilitating the user authentication comprises leveraging a network provider-based authentication system to verify an identity of the user based on at least a portion of the data associated with the user, the user device, or the combination thereof.

In some implementations of these embodiments, the action comprises associating the SIM swap with the user, thereby enabling tracking of the SIM swap relative to the user.

In some implementations of these embodiments, the action comprises providing information regarding the SIM swap to the user device, and causing the user device to present a user prompt to verify the information.

In some implementations of these embodiments, the generated code is limited to a single use, and the action comprises verifying whether the detected code corresponds to the generated code.

In some implementations of these embodiments, based on a first determination that the user authentication is successful and based on a second determination that the detected code corresponds to the generated code, the action comprises proceeding to update one or more network systems to effect the SIM swap.

In some implementations of these embodiments, based on a first determination that the user authentication is unsuccessful or based on a second determination that the detected code does not correspond to the generated code, the action comprises preventing updating of one or more network systems for the SIM swap.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2C:
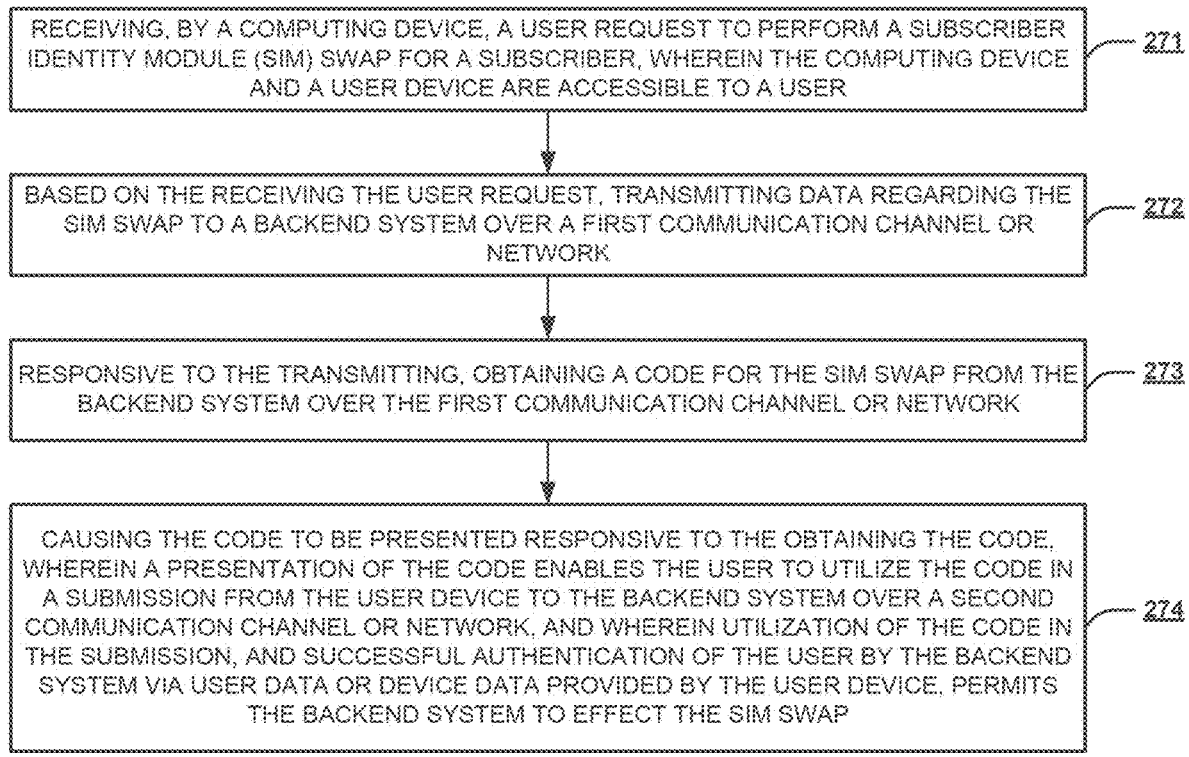
FIG. 2C depicts an illustrative embodiment of a method in accordance with various aspects described herein.

FIG. 2C depicts an illustrative embodiment of a method 270 in accordance with various aspects described herein. In some embodiments, one or more process blocks of FIG. 2C can be performed by a computing device, such as the computing device 204. In some embodiments, one or more process blocks of FIG. 2C may be performed by another device or a group of devices separate from or including the computing device 204, such as the user device 202 and/or the backend system 206.

At 271, the method can include receiving a user request to perform a subscriber identity module (SIM) swap for a subscriber, wherein a computing device and a user device are accessible to a user. For example, the computing device 204 can, similar to that described elsewhere herein, perform one or more operations that include receiving a user request to perform a subscriber identity module (SIM) swap for a subscriber. Here, the computing device and a user device may be accessible to a user.

At 272, the method can include, based on the receiving the user request, transmitting data regarding the SIM swap to a backend system over a first communication channel or network. For example, the computing device 204 can, similar to that described elsewhere herein, perform one or more operations that include, based on the receiving the user request, transmitting data regarding the SIM swap to a backend system over a first communication channel or network.

At 273, the method can include, responsive to the transmitting, obtaining a code for the SIM swap from the backend system over the first communication channel or network. For example, the computing device 204 can, similar to that described elsewhere herein, perform one or more operations that include, responsive to the transmitting, obtaining a code for the SIM swap from the backend system over the first communication channel or network.

At 274, the method can include causing the code to be presented responsive to the obtaining the code, wherein a presentation of the code enables the user to utilize the code in a submission from the user device to the backend system over a second communication channel or network, and wherein utilization of the code in the submission, and successful authentication of the user by the backend system via user data or device data provided by the user device, permits the backend system to effect the SIM swap. For example, the computing device 204 can, similar to that described elsewhere herein, perform one or more operations that include causing the code to be presented responsive to the obtaining the code. Here, a presentation of the code may enable the user to utilize the code in a submission from the user device to the backend system over a second communication channel or network, and utilization of the code in the submission, and successful authentication of the user by the backend system via user data or device data provided by the user device, may permit the backend system to effect the SIM swap.

In some implementations of these embodiments, the first communication channel or network is different from the second communication channel or network.

In some implementations of these embodiments, the computing device is associated with a network provider and is located at a physical store location or in a customer service data center.

In some implementations of these embodiments, the user request includes information identifying a phone number associated with the subscriber, information identifying a source SIM, and information identifying a target SIM.

In some implementations of these embodiments, successful authentication of the user is in accordance with a network provider-based authentication system verifying an identity of the user based on the user data, the device data, or a combination thereof.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2D:
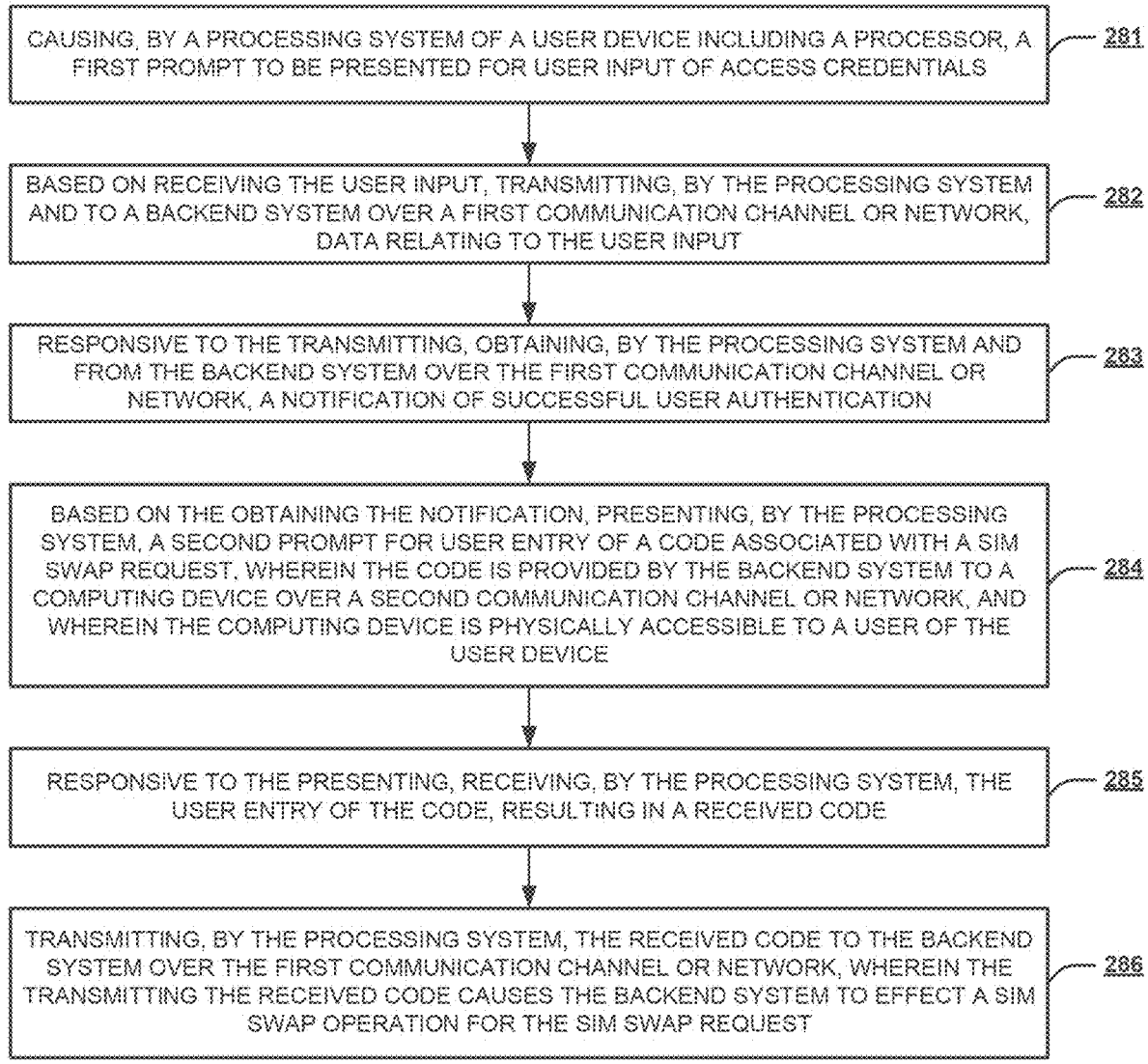
FIG. 2D depicts an illustrative embodiment of a method in accordance with various aspects described herein.

FIG. 2D depicts an illustrative embodiment of a method 280 in accordance with various aspects described herein. In some embodiments, one or more process blocks of FIG. 2D can be performed by a user device, such as the user device 202. In some embodiments, one or more process blocks of FIG. 2D may be performed by another device or a group of devices separate from or including the user device 202, such as the computing device 204 and/or the backend system 206.

At 281, the method can include causing, by a processing system of a user device including a processor, a first prompt to be presented for user input of access credentials. For example, the user device 202 can, similar to that described elsewhere herein, perform one or more operations that include causing a first prompt to be presented for user input of access credentials.

At 282, the method can include, based on receiving the user input, transmitting, by the processing system and to a backend system over a first communication channel or network, data relating to the user input. For example, the user device 202 can, similar to that described elsewhere herein, perform one or more operations that include, based on receiving the user input, transmitting to a backend system over a first communication channel or network, data relating to the user input.

At 283, the method can include, responsive to the transmitting, obtaining, by the processing system and from the backend system over the first communication channel or network, a notification of successful user authentication. For example, the user device 202 can, similar to that described elsewhere herein, perform one or more operations that include, responsive to the transmitting, obtaining, from the backend system over the first communication channel or network, a notification of successful user authentication.

At 284, the method can include, based on the obtaining the notification, presenting, by the processing system, a second prompt for user entry of a code associated with a SIM swap request, wherein the code is provided by the backend system to a computing device over a second communication channel or network, and wherein the computing device is physically accessible to a user of the user device. For example, the user device 202 can, similar to that described elsewhere herein, perform one or more operations that include, based on the obtaining the notification, presenting a second prompt for user entry of a code associated with a SIM swap request. Here, the code may be provided by the backend system to a computing device over a second communication channel or network, and the computing device may be physically accessible to a user of the user device.

At 285, the method can include, responsive to the presenting, receiving, by the processing system, the user entry of the code, resulting in a received code. For example, the user device 202 can, similar to that described elsewhere herein, perform one or more operations that include, responsive to the presenting, receiving the user entry of the code, resulting in a received code.

At 286, the method can include transmitting, by the processing system, the received code to the backend system over the first communication channel or network, wherein the transmitting the received code causes the backend system to effect a SIM swap operation for the SIM swap request. For example, the user device 202 can, similar to that described elsewhere herein, perform one or more operations that include transmitting the received code to the backend system over the first communication channel or network. Here, the transmitting the received code may cause the backend system to effect a SIM swap operation for the SIM swap request.

In some implementations of these embodiments, the first communication channel or network comprises a mobile network, and the second communication channel or network comprises a different type of network.

In some implementations of these embodiments, the SIM swap request is initiated by the user using the computing device.

In some implementations of these embodiments, the SIM swap request includes information identifying a phone number associated with a subscriber, information identifying a source SIM, and information identifying a target SIM.

In some implementations of these embodiments, the user comprises an agent of a network provider.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
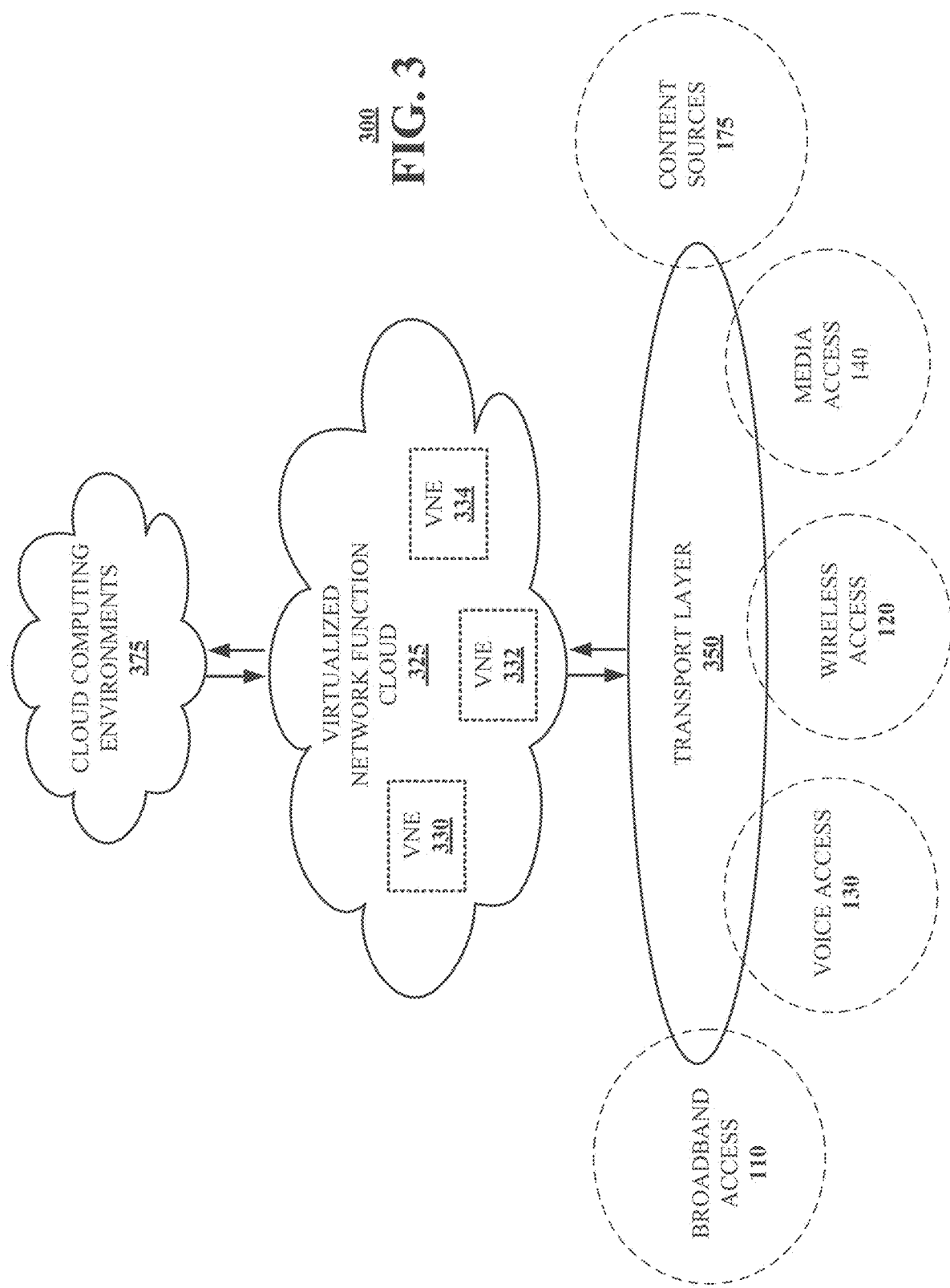
FIG. 3 is a block diagram illustrating an example, non-limiting embodiment of a virtualized communications network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, and methods 260, 270, and 280 presented in FIGS. 1 and 2A-2D. For example, virtualized communications network 300 can facilitate, in whole or in part, out-of-band authentication(s) to minimize or eliminate SIM swap fraud.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
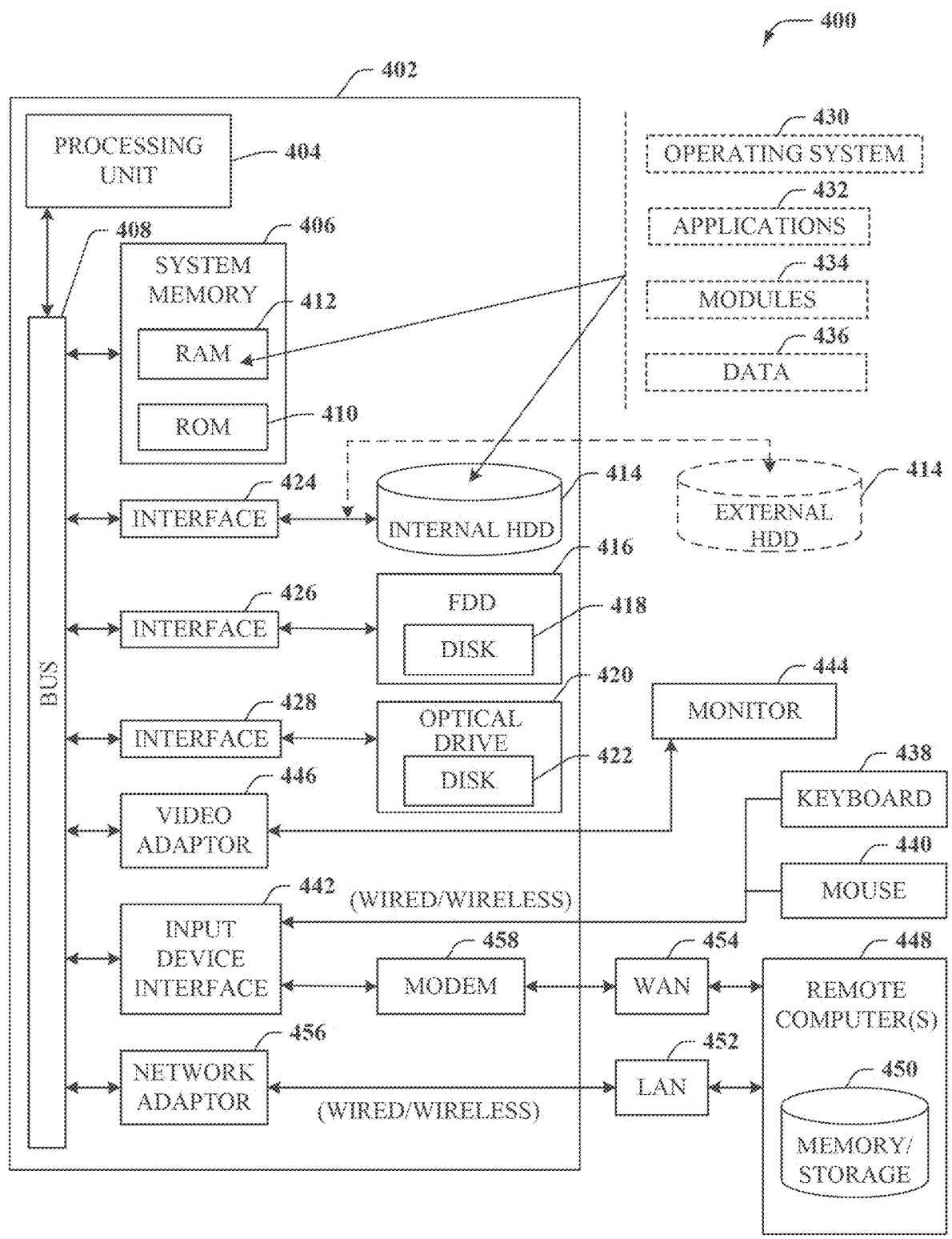
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, out-of-band authentication(s) to minimize or eliminate SIM swap fraud.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
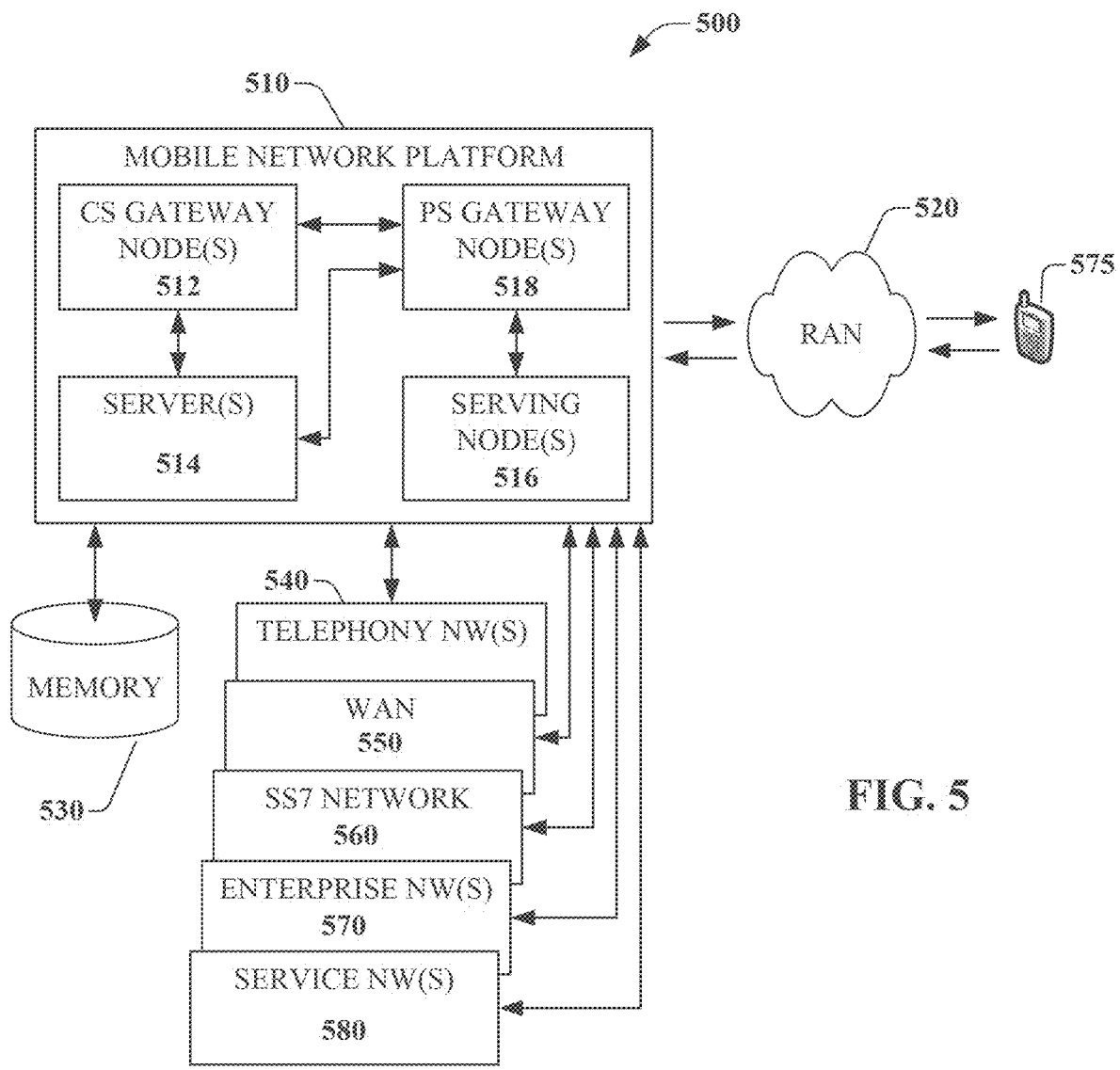
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, out-of-band authentication(s) to minimize or eliminate SIM swap fraud. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
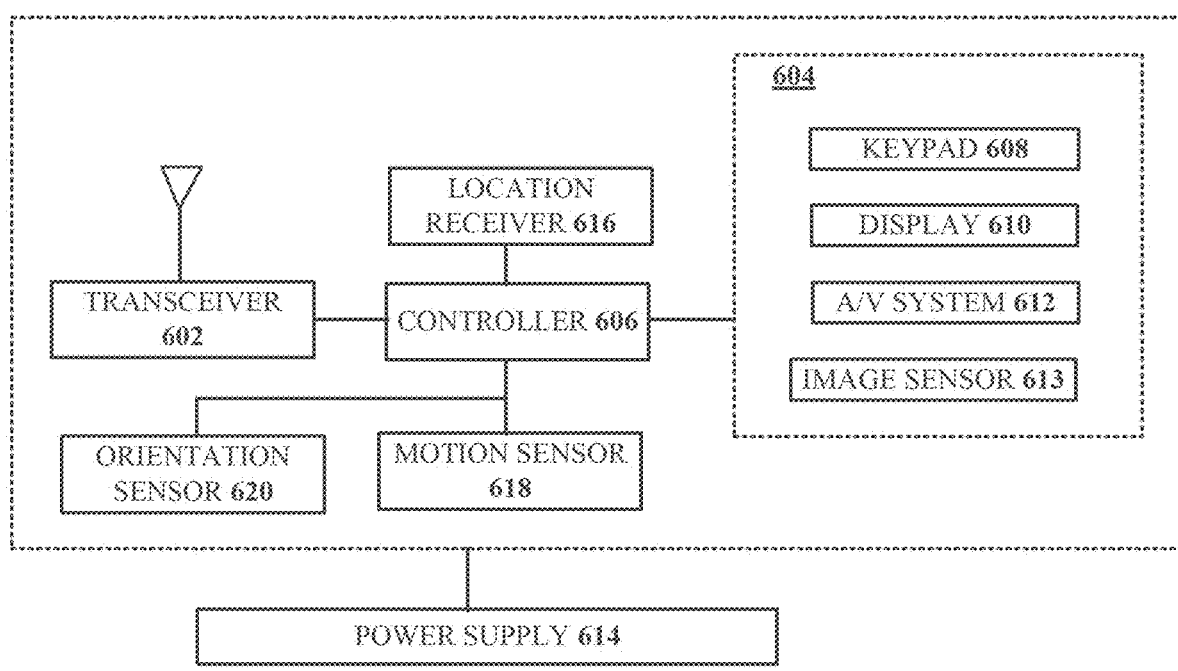
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate, in whole or in part, out-of-band authentication(s) to minimize or eliminate SIM swap fraud.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage." "database." and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4 \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station." "access terminal." "terminal," "handset." "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving, from a computing device, a user request to perform a subscriber identity module (SIM) swap for a subscriber, wherein the computing device and a user device are accessible to a user;

based on the receiving the user request, generating a code for the SIM swap, resulting in a generated code;
providing the generated code to the computing device for presentation;
obtaining, from the user device, data, resulting in obtained data, associated with the user, the user device, or a combination thereof;
facilitating user authentication based on the obtained data;
detecting a transmission of a particular code from the user device, resulting in a detected code; and
based on the detecting the transmission, the detected code, the facilitating the user authentication and the generated code, performing an action relating to the SIM swap.

2. The device of claim 1, wherein the computing device is a determined untrusted device and is communicatively coupled with the device over a first communication channel or network, and wherein the user device is a determined trusted device and is communicatively coupled with the device over a second communication channel or network different from the first communication channel or network.

3. The device of claim 1, wherein the user request includes information identifying a phone number associated with the subscriber, information identifying a source SIM, and information identifying a target SIM.

4. The device of claim 1, wherein the data associated with the user, the user device, or the combination thereof comprises SIM data stored in the user device, a serial number of the user device, location data associated with the user device, information regarding a network access point to which the user device is communicatively coupled, biometric information associated with the user, access credentials inputted by the user, or a combination thereof.

5. The device of claim 4, wherein the facilitating the user authentication comprises leveraging a network provider-based authentication system to verify an identity of the user based on at least a portion of the data associated with the user, the user device, or the combination thereof.

6. The device of claim 1, wherein the action comprises associating the SIM swap with the user, thereby enabling tracking of the SIM swap relative to the user.

7. The device of claim 1, wherein the action comprises providing information regarding the SIM swap to the user device, and causing the user device to present a user prompt to verify the information.

8. The device of claim 1, wherein the generated code is limited to a single use, and wherein the action comprises verifying whether the detected code corresponds to the generated code.

9. The device of claim 1, wherein, based on a first determination that the user authentication is successful and based on a second determination that the detected code corresponds to the generated code, the action comprises proceeding to update one or more network systems to effect the SIM swap.

10. The device of claim 1, wherein, based on a first determination that the user authentication is unsuccessful or based on a second determination that the detected code does not correspond to the generated code, the action comprises preventing updating of one or more network systems for the SIM swap.

11. A non-transitory machine-readable medium, comprising executable instructions that, when executed by a processing system including a processor, facilitate performance of operations, the operations comprising:

receiving, from a computing device, a user request to perform a subscriber identity module (SIM) swap for a subscriber, wherein the computing device and a user device are accessible to a user;
based on the receiving the user request, generating a code for the SIM swap, resulting in a generated code;
providing the generated code to the computing device for presentation;
obtaining, from the user device, data associated with the user;
facilitating user authentication based on the obtaining the data;
detecting a transmission of a particular code from the user device, resulting in a detected code; and
based on the detecting the transmission, the facilitating the user authentication and the generated code, performing an action relating to the SIM swap.

12. The non-transitory machine-readable medium of claim 11, wherein the computing device is a determined untrusted device and is communicatively coupled with a device over a first communication channel or network, and wherein the user device is a determined trusted device and is communicatively coupled with the device over a second communication channel or network different from the first communication channel or network.

13. The non-transitory machine-readable medium of claim 11, wherein the user request includes information identifying a phone number associated with the subscriber, information identifying a source SIM, and information identifying a target SIM.

14. The non-transitory machine-readable medium of claim 11, wherein the data associated with the user comprises biometric information associated with the user, access credentials inputted by the user, or a combination thereof.

15. The non-transitory machine-readable medium of claim 14, wherein the facilitating the user authentication comprises leveraging a network provider-based authentication system to verify an identity of the user based on at least a portion of the data associated with the user.

16. A method, comprising:
receiving, by a processing system including a processor and from a computing device, a user request to perform a subscriber identity module (SIM) swap for a subscriber, wherein the computing device and a user device are accessible to a user;
based on the receiving the user request, generating, by the processing system, a code for the SIM swap, resulting in a generated code;
providing, by the processing system, the generated code to the computing device for presentation;
obtaining, by the processing system and from the user device, data associated with the user device;
facilitating, by the processing system, user authentication based on the obtaining the data;
detecting, by the processing system, a transmission of a particular code from the user device, resulting in a detected code; and
based on the detecting the transmission, the facilitating the user authentication and the generated code, performing, by the processing system, an action relating to the SIM swap.

17. The method of claim 16, wherein the computing device is a determined untrusted device and is communicatively coupled with a device over a first communication channel or network, and wherein the user device is a determined trusted device and is communicatively coupled with the device over a second communication channel or network different from the first communication channel or network.

18. The method of claim 16, wherein the user request includes information identifying a phone number associated with the subscriber, information identifying a source SIM, and information identifying a target SIM.

19. The method of claim 16, wherein the data associated with the user device comprises SIM data stored in the user device, a serial number of the user device, location data associated with the user device, information regarding a network access point to which the user device is communicatively coupled, or a combination thereof.

20. The method of claim 19, wherein the facilitating the user authentication comprises leveraging a network provider-based authentication system to verify an identity of the user based on at least a portion of the data associated with the user device.

* * * * *